US008553946B2

(12) United States Patent
Serbanescu

(10) Patent No.: US 8,553,946 B2
(45) Date of Patent: Oct. 8, 2013

(54) DISPLAYING ELEVATION INFORMATION FROM A DIGITAL MAP

(75) Inventor: Alexandru Serbanescu, Amstelveen (NL)

(73) Assignee: Tomtom International B.V., Amsterdam (NL)

( * ) Notice: Subject to any disclaimer, the term of this patent is extended or adjusted under 35 U.S.C. 154(b) by 1674 days.

(21) Appl. No.: 12/007,375

(22) Filed: Jan. 9, 2008

(65) Prior Publication Data

US 2008/0212893 A1 Sep. 4, 2008

Related U.S. Application Data

(60) Provisional application No. 60/879,607, filed on Jan. 10, 2007.

(51) Int. Cl.
*G06K 9/00* (2006.01)

(52) U.S. Cl.
USPC ............................ 382/113; 382/106; 345/426

(58) Field of Classification Search
USPC .................... 345/426; 382/106, 113
See application file for complete search history.

(56) References Cited

U.S. PATENT DOCUMENTS

| | | | | |
|---|---|---|---|---|
| 4,970,682 A * | 11/1990 | Beckwith et al. | | 1/1 |
| 5,140,532 A * | 8/1992 | Beckwith et al. | | 358/1.1 |
| 5,542,032 A * | 7/1996 | Pritt | | 345/421 |
| 5,579,456 A * | 11/1996 | Cosman | | 345/419 |
| 6,288,721 B1 * | 9/2001 | Donoghue et al. | | 345/426 |
| 6,434,481 B2 * | 8/2002 | Winter et al. | | 701/439 |
| 6,600,489 B2 * | 7/2003 | Cook | | 345/426 |
| 6,654,490 B2 * | 11/2003 | Love | | 382/154 |
| 6,765,584 B1 * | 7/2004 | Wloka et al. | | 345/584 |
| 6,819,319 B1 * | 11/2004 | Fenney | | 345/426 |
| 7,098,809 B2 * | 8/2006 | Feyereisen et al. | | 340/963 |
| 7,107,146 B2 * | 9/2006 | Christianson | | 701/454 |
| 7,116,806 B2 * | 10/2006 | Werthiem et al. | | 382/124 |
| 7,242,407 B2 * | 7/2007 | Blais | | 345/582 |
| 7,283,654 B2 * | 10/2007 | McLain | | 382/128 |
| 7,612,775 B2 * | 11/2009 | Goyne et al. | | 345/423 |
| 7,764,282 B2 * | 7/2010 | Chiba | | 345/419 |
| 2004/0160341 A1 * | 8/2004 | Feyereisen et al. | | 340/970 |
| 2005/0104884 A1 * | 5/2005 | Iwata et al. | | 345/440 |
| 2007/0146364 A1 * | 6/2007 | Aspen | | 345/426 |
| 2008/0212893 A1 * | 9/2008 | Serbanescu | | 382/274 |

OTHER PUBLICATIONS

Feibush et al: "Geo-spatial visualization for situational awareness" Visualization '99. Proceedings San Francisco, CA, USA Oct. 24-29, 1999, Piscataway, NJ, USA,IEEE, US, Jan. 1, 1999, p. 441-443,559, XP031172641 ISBN: 978-0-7803-5897-3.*

Rayson, James: "Aggregate Towers: Scale Sensitive Visualization and Decluttering of Geospatial Data" Proceedings. IEEE Symposium on Information Visualization, XX, XX, Oct. 1, 1999, pp. 92-99,149, XP002942892.*

* cited by examiner

*Primary Examiner* — Aaron W Carter

(57) ABSTRACT

A method and apparatus are described for rendering a display image generated from digital map information. The method includes the steps of:
- determining elevation information (20a) from the digital map information;
- determining display scale information (28) for the display image; and
- determining (22) a shading value to apply to a pixel in the display image, and
- applying the shading value to the respective pixel in the display image, to generate a display (24) that represents elevation information by pixel shading.

The shading value varies as a function of the elevation information and the display scale information, whereby the display is generated to represent elevation information by pixel shading that varies with display scale.

24 Claims, 6 Drawing Sheets

DISPLAYING ELEVATION INFORMATION FROM A DIGITAL MAP

PRIORITY STATEMENT

The present application hereby claims priority under 35 U.S.C. §119(e) on U.S. Provisional Patent Application No. 60/879,607 filed Jan. 10, 2007, the entire contents of which is hereby incorporated herein by reference.

FIELD OF THE INVENTION

This invention relates to an apparatus and method for generating a display from a digital map, the display including a representation of elevation information. The invention is especially suitable for navigation devices, including portable navigation devices (so-called PNDs), but may find utility in any type of processing device for generating a display from digital map information.

BACKGROUND TO THE INVENTION

Two methods are known for rendering elevation information in a display generated from an electronic map, namely (i) isolines (also called contour lines) representing points of the same elevation, and (ii) shading of the map colour to represent elevation information. While isolines may provide an accurate representation of elevation, isolines can clutter the map display and are not intuitive to all users. Map clutter may be a particular problem when displaying the map on a relatively small electronic display device, or when it is also desired to display other map information such as navigation and location information. Shading can provide a more intuitive representation of elevation information without cluttering the display. As used herein, the term "shading" means applying a darkening and/or lightening of the map colour, akin to a positive or negative shadow.

Referring to FIG. 1, a conventional technique for shading is to include the shading as a static feature of the map colour in the digital map. A digital map 12 is generated by processing map source information 10 that includes elevation data, to create the shading as a static template within the background colour in the digital map 12. To display the digital map 12, a rendering process 14 is used to generate an image 18 including the fixed elevation shading template at a desired display scale represented by a display scale input 16.

In devising the present invention, it has been appreciated that the above technique lacks considerable finesse in being able to adapt to displaying the map at different viewing scales or zoom levels. The shading is fixed as part of the digital map 12, and is not adaptive. The shading pattern also depends on the specific shading technique used when creating the digital map 12. Different shading techniques create different shading patterns based on the same elevation data. While a certain shading technique may be suited to displaying the map at a certain display scale, generating a display at other display scales can require interpolation or averaging of the shading pattern. This can create severe inaccuracies in the elevation shading. For example, as the display scale is varied, peaks and valleys in the elevation may appear to change shape and location as a result of averaging or interpolation inaccuracies.

The present invention has been devised bearing the above problems in mind.

SUMMARY OF THE INVENTION

In pursuit of this aim, a presently preferred embodiment of the present invention provides a method of rendering a display image generated from digital map information. The method includes the steps of:
- determining elevation information from the digital map information;
- determining display scale information for the display image; and
- determining a shading value to apply to a pixel in the display image, and
- applying the shading value to the respective pixel in the display image, to generate a display that represents elevation information by pixel shading.

The shading value varies as a function of the elevation information and the display scale information, whereby the display is generated to represent elevation information by pixel shading that varies with display scale.

Features and advantages of the invention include: (i) ability to dynamically render a map image with elevation shading that is relevant to the display scale being used; (ii) ability to smoothly vary the elevation shading as the display scale is varied between two extremes; and (iii) avoiding the problems of a single fixed shading pattern used in the prior art.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention are now described with reference to any system for generating a display using a digital map. The system may comprise an automomous device, such as a portable navigation device, a portable map viewer, a device including a positioning system (for example, a satellite based positioning system such as a Global Positioning System (GPS)), a portable digital assistant (PDA), a portable computer, or non-portable computer. Alternatively, the system may comprise a server storing the digital map, and a remote terminal or computer configured to generate a display of the digital map based on information received from the server over one or more networks, such as an internet or intranet. One application for which provision of elevation information is especially useful is for a pedestrian and hiking navigation device or system.

Figure 1:
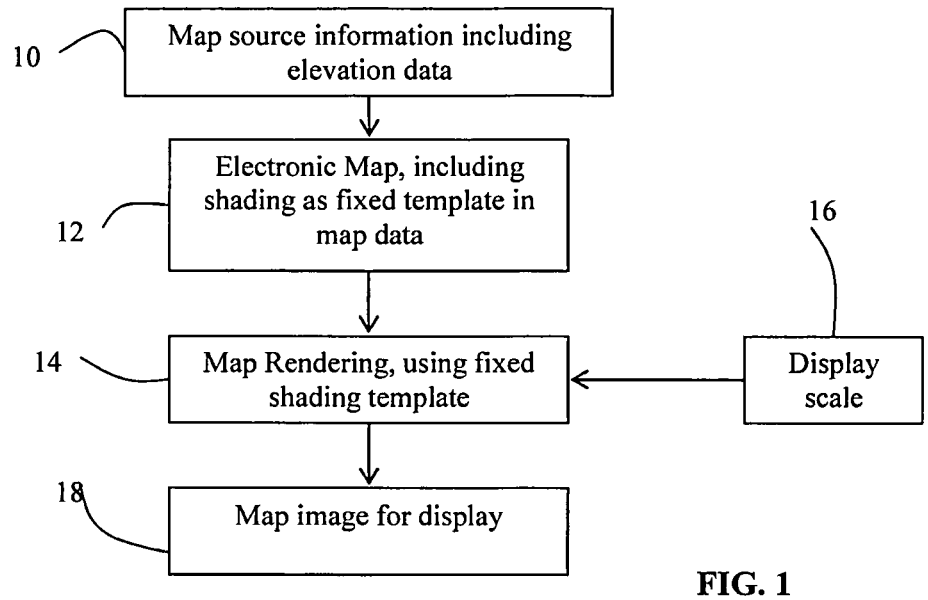
FIG. 1 is a schematic illustration of a conventional application of shading during the creation of a digital map.
Figure 2:
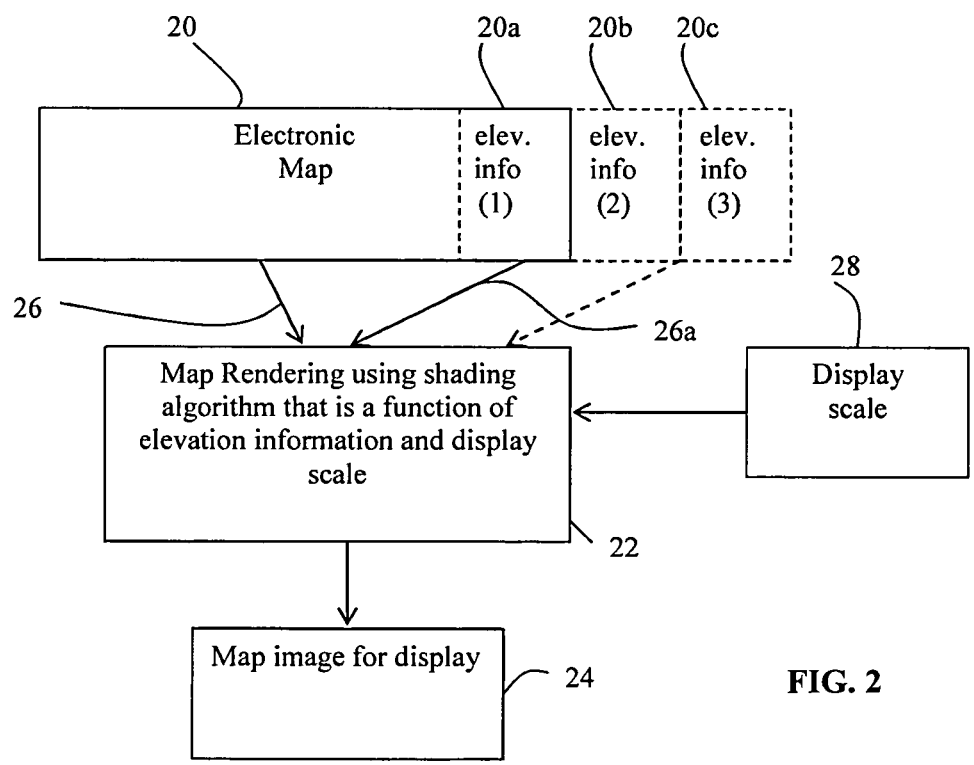
FIG. 2 is a schematic illustration of processing in a preferred embodiment of the invention, using dynamic processing to render a map display using display scale information.

FIG. 2 illustrates schematically a technique for generating a map display including elevation shading in a preferred embodiment. A digital map 20 includes elevation information 20a indicative of elevation at different points in the digital map 20. The digital map 20 may be a database of map information stored in any suitable storage medium, for example but not limited to, an optical storage medium, non-volatile electronic memory, volatile electronic memory, a magnetic storage medium, or a magneto-optical storage medium. The elevation information 20a may represent a grid of values (a matrix of points). It makes no difference the way the data is stored. As an example, the surface of the Earth may be divided in some small patches of 3" in latitude and 3" in longitude. This mean that the distance between two adjacent points in the data matrix on vertical will be of 3" (about 90 m considering that the length of a degree of latitude is almost the same regardless of the position). On horizontal it will be also 3" (the values in meters will depend on the latitude in this case).

A map rendering module 22 dynamically renders a display image 24 based on (i) map information 26 received from the digital map 20, (ii) elevation information 26a also received from the digital map 20, and (iii) display scale information 28 indicating the display scale of the image 24, ie. the degree to which the map image is zoomed in towards, or zoomed out from, the map. In one form, the display scale is represented by a notional viewing (or zoom-out) height value "z" above the map. A relatively large display scale is represented by a respectively small value of z, and a relatively small display scale is represented by a respectively large value of z. The map rendering module 22 may comprise dedicated graphics processor circuitry and/or rendering software executed by a general purpose processor.

The map rendering module 22 is configured to render the map by applying a shading algorithm that darkens and/or lightens the map color to represent elevation in the map image 24. The output will be represented by the percentage of shading applied to each pixel on the screen. The screen is normally represented by a matrix of pixels, which gives the resolution of the screen. Each pixel has a colour associated with, in this case, the form of relief that it represents (for example, different colours for meadow, forest, built area, etc.), as represented by the map information 26. The term "shading percentage" is an indication of the extent the that colour should be darkened or made lighter (whitened). A negative shading percentage takes the colour closer to white, and a positive shading percentage takes the colour closer to black. The shading algorithm is a function of (i) the elevation information 20a/26a from the digital map 20, and (ii) the display scale information 28. The shading algorithm is configured to vary the shading style based on the same elevation information, as a varying function of the display scale information. In other words, as the display scale is varied, not just the magnification of the shading is varied, but also the style of shading. This enables the style of shading to be adapted to the display scale of the image 24.

Before the overall shading algorithm is explained, it is useful to illustrate how two different styles of shading produce different shading patterns suitable for different display scales.

Figure 5A:
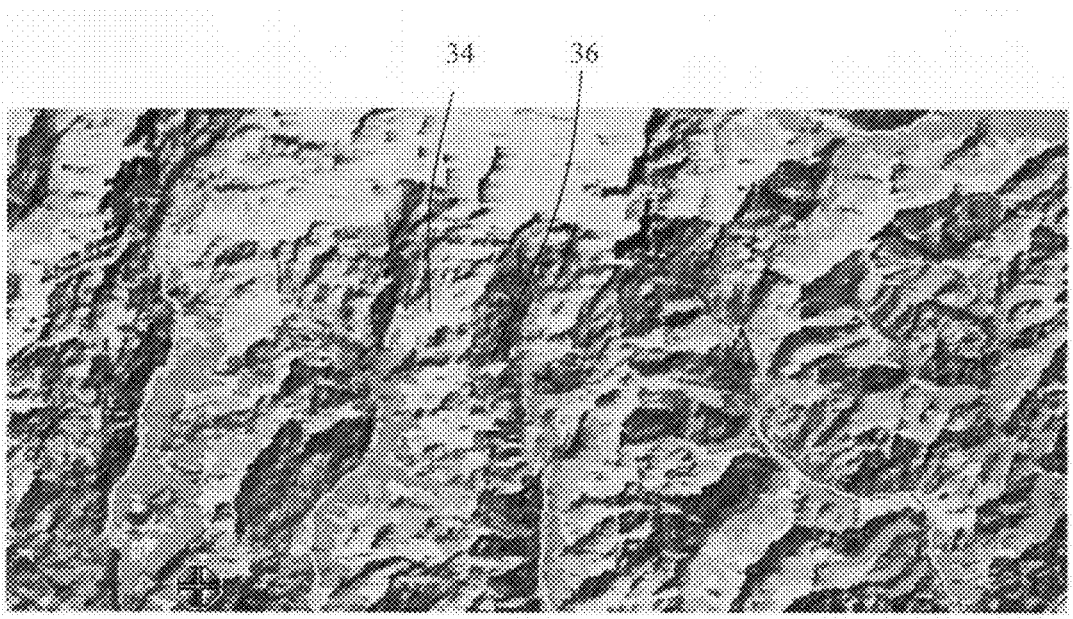
FIGS. 5a-5f are schematic illustrations of screenshots of a rendered map image at different display scales, decreasing in display scale (increasing in zoom out height) from FIG. 5a to FIG. 5f.
Figure 5B:
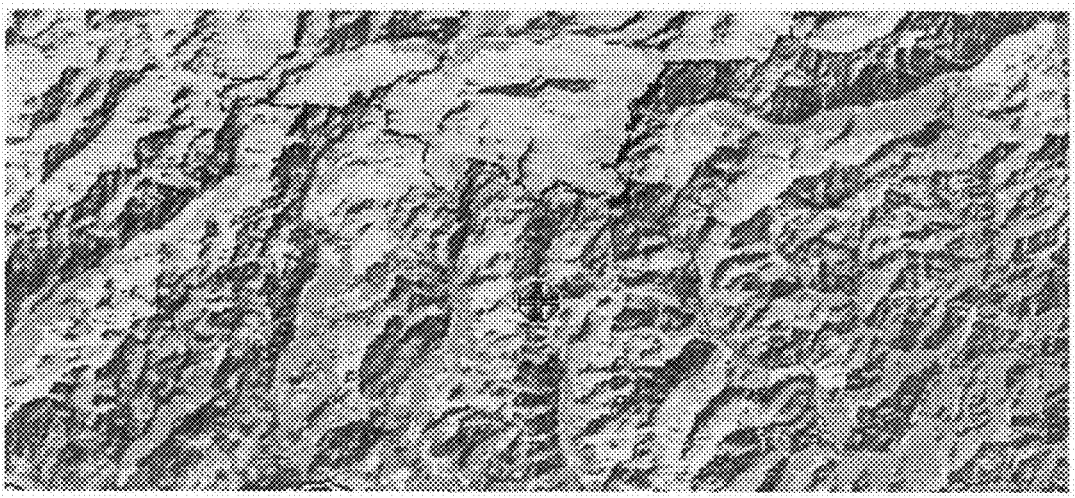
Figure 5C:
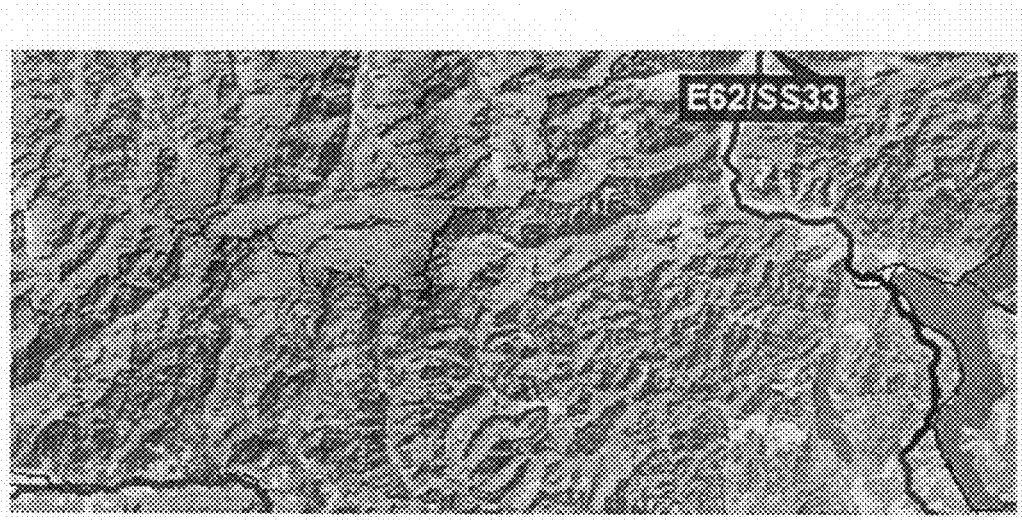
Figure 5D:
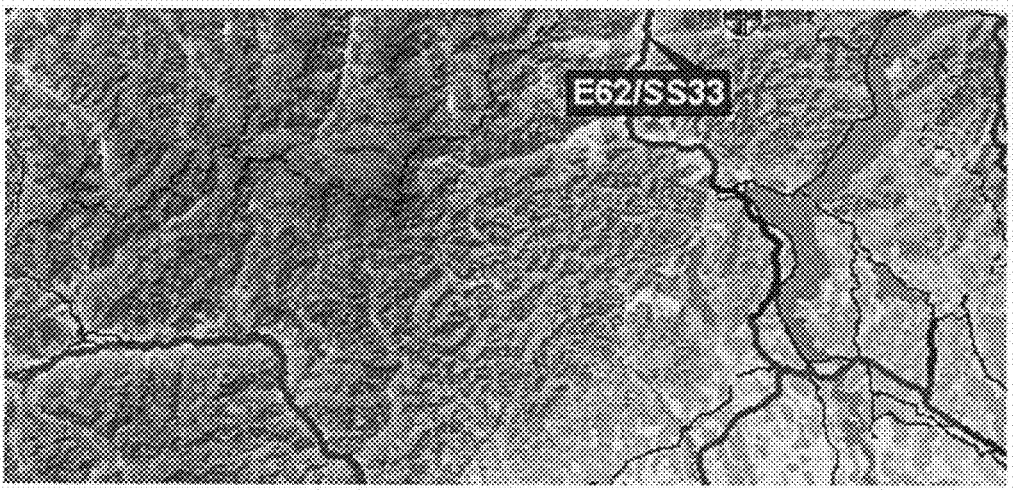
Figure 5E:
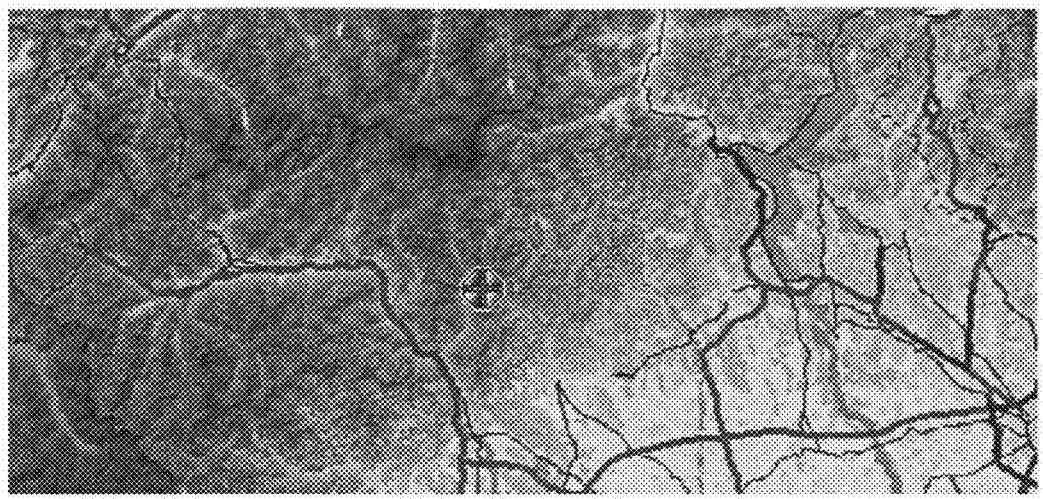
Figure 5F:

A first shading style is to apply shading that depends on the absolute elevation of an individual point in the image. A typical shading pattern produced using predominantly this style is illustrated in FIG. 5f. Darker image shading represents points of higher elevation. For example, peaks 30 are indicated by areas of local maxima in darkness shading, whereas valleys 32 are indicated by areas of local minima in darkness (local maxima in lightness). This first type of shading style is suitable for relatively small display scales (high zoom out away from the map), in which there may be significant changes in absolute elevation in close proximity in the map image. The first shading style is less suitable for relatively large display scales (zoomed in towards the map), in which the elevation may be substantially the same across the entire display image, leading to almost constant shading that obscures local relief features.

A very different second shading style is based on elevation slope, namely the difference in elevation between adjacent points in the display image, taken in a certain sampling direction, for example, from North-West to South-East. A negative slope is rendered with one type of shading (e.g. with a lighter colour 34), and a positive slope with another type of shading (e.g. a darker colour 36). The steeper the slope the lighter or respective darker the colour that is used. A typical shading pattern produced using predominantly this style is illustrated in FIG. 5a. This second shading style is suited to large display scales (zoomed in towards the map), it is more responsive to local relief detail even though the absolute elevation may change only fractionally, and can generate intuitive shading for large display scale. However, the second shading style technique is less well suited to small display scale, where two display points on which the slope is calculated may be geographically remote, and so calculating an elevation slope between these points may not provide useful information. For example, if the two display points are of about the same elevation, but on opposite sides of a mountain peak, then the peak will not be represented by any shading using the second technique, because there is little difference between the elevations at the two display points, and important elevation features can easily be lost.

In the present embodiment, the shading algorithm preferably combines first and second different shading functions or styles, each weighted by a respective coefficient indicating the respective strength of contribution of each shading function as a component of the shading algorithm. Preferably, the coefficients vary as a function of the display scale information 28 (for example, the zoom out height "z"). More preferably, the coefficients vary as a substantially continuous function of the display scale information. When two shading functions are used, a single coefficient l(z) may be used, where l(z) takes values between zero and 1, (l(z)∈[0,1]), with l(z) representing the weight of one shading function, and 1−l(z) representing the weight of the other shading function.

The coefficient l(z) could vary linearly as a function of the display scale "z". However, referring to FIG. 3, it is preferred that l(z) vary asymptotically between two limits as a function of the display scale. At large and medium display scales (small and medium "zoom-out" levels "z" away from the map), the predominant shading function is the slope based shading function (second shading function) and at small display scales (high "zoom-out" level "z"), the predominant shading function is the absolute elevation based function (first shading function). The value of l is big in the first case and small in the second.

In a preferred embodiment, and using the following variables:

α the angle of the elevation slope,
h the current height (elevation) and
z the zoom-out level (display scale)

the shading percentage p will be given by the following function:

$$p = P\frac{W_1(\sin(\alpha))}{W_2(h)}$$

or in a more explicit form $$p = (l(z)P_{slope}(\alpha) + (1-l(z))P_{height}(h))\frac{W_1(\sin(\alpha))}{W_2(h)}$$

where l∈[0,1] (the weight factor) is the function of the zoom level that takes values in the interval 0 . . . 1, $P_{slope}$ (α) is the slope dependent shading percentage function (second shading function referred to above) and the $P_{height}$ (h) is the absolute height dependent shading percentage function (first shading function referred to above).

Figure 3:
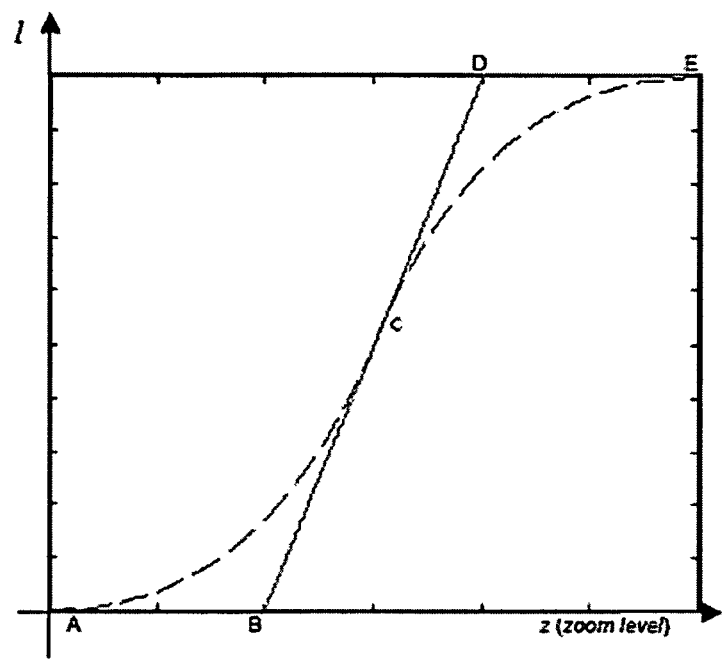
FIG. 3 is a schematic illustration of a weighting function used in a shading algorithm of the preferred embodiment.

As illustrated in FIG. 3, the function l(z) is preferably chosen to be composed by a sequence of two Bezier spline curve. The main idea behind this approach is to use a function which is "almost" asymptotic towards 0 when z approaches A and "almost" asymptotic towards 1 when z approaches E. We may see in this case the zoom value z in A as the lowest zoom level considered in this case and the value in E as the highest. Choosing a sequence of two Bezier splines (see ABC and CDE) can achieve the freedom to choose different convergence rates for the evolution up to the break even point C and for the one afterwards. It is essentially this type of evolution and the solution chosen which gives to the solution an optimal transition between the two criteria. The control points A, B, C, D, E can be tuned to achieve the optimal transition between the two shading criteria.

The two shading percentage functions presented above can be computed by using the following formulas:

$$P_{height}(h) = \frac{h}{h_{max}},$$

where $h_{max}$ is a conventional maximal value of the altitude and $P_{slope}(\alpha) = \sin(\alpha)$.

Figure 4:
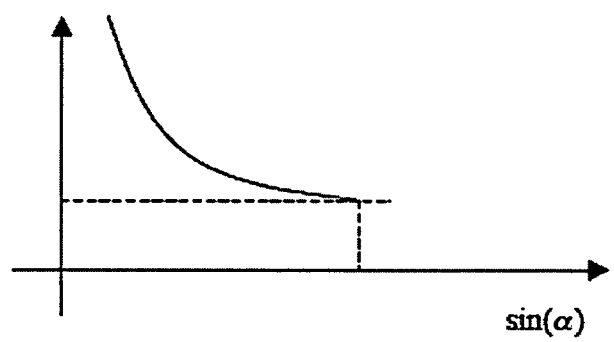
FIG. 4 is a schematic illustration of a sub-weighting function used in the shading algorithm of the preferred embodiment.

The main formula also includes two sub-unitary, or secondary, weight functions for "tuning" the combined shading effect. The $W_1(\sin(\alpha))$ component is a sub-unitary weight function which tries to attenuate the height values of the slope and has a descending hyperbolic graphic, which "almost" asymptotically approach a minimum value when sin(α) approaches 1 (as illustrated in FIG. 4). $W_2$(h) has the same type of evolution but this time as h approaches the conventional maximal value of the altitude. As a remark, $W_2$(h) is dependent also on the altitude h but the main difference with respect of $P_{height}$(h) is that in this case the height is only used to accentuate the globally computed percentage P with respect of the altitude to give a bulk view over the mountains missives but it doesn't change the nature of the rendering (the sign of the shading percentage doesn't change). At the same altitude two pixels with the same slope will have the same shading percentage. The only difference is that the same slope will be more visible at higher altitude than in the plains. These secondary weight functions provide useful tuning of the graphic effect in the display, but could be omitted if preferred.

FIG. 5 illustrates a range of screenshots for different zoom out levels to illustrate the way the method works. The screenshots show how the shading algorithm algorithm works for a region in the Alps (around Alagna Valsssesia in Italy) starting from the medium zoom levels to the higher ones. The zoom out levels are: FIG. 5a, z=372 (weighting coefficient l(z)=0); FIG. 5b, z=561 (weighting coefficient l(z)=0.091); FIG. 5c, z=846 (weighting coefficient l(z)=0.201); FIG. 5d, z=1134 (weighting coefficient l(z)=0.355); FIG. 5e, z=1520 (weighting coefficient l(z)=0.595); and FIG. 5f, z=3073 (weighting coefficient l(z)=0.743). The shading based on slope is done from North-West to South-East. In FIG. 5, it can be seen how, as the zoom-out level "z" increases (moving from large display scale to small display scale) the display smoothly shifts from one type of shading style rendering to another. The negative lighter slopes become darker but the overall image continues to give a correct image of the relief. In correlation with FIG. 3 the following values for the zoom level thresholds may be used:

A point (start transition)—z=500,
C point (break even point)—z=1500,
E point (end of transition)—z=4500.

In the present embodiment, the elevation information 20a is provided as absolute elevation information for points in the digital map 20, and the rending module 22 performs all of the calculations necessary to calculate a shading percentage to apply to each display pixel. In an alternative form, the elevation information 20a could, alternatively or additionally, include pre-calculated values (for example of one or more of h, α, $P_{height}$(h), $P_{slope}(\alpha)$, and/or l(z)), for use in the shading algorithm, to reduce the calculation burden within the rendering module. In one alternative, the elevation information 20a may be represented directly as the pre-calculated shading percentages according to the first and second different shading functions. Even though the shading percentages may be pre-calculated in the digital map 20, the provision of at least first and second different shading percentages for the same point, can enable dynamic rending according to the display scale, by applying a weighted combination of the two pre-calculated percentages using the same principles as described above. In FIG. 2, such additional elevation information is represented in the digital map 20 at 20b.

Although the shading algorithm has been expressed as a mathematical function that may be calculated on demand by a suitable processor, an alternative is to provide a function map containing pre-calculated values, for example, as a function of look-up coordinate variables (α the angle of the elevation slope, h the current height (elevation), and z the zoom-out level (display scale)). Such a pre-calculated function map could be provided within the map display apparatus, or it could be incorporated as an integral part of the data representing the digital map 20 (represented in FIG. 2 at 20c).

Figure 6:
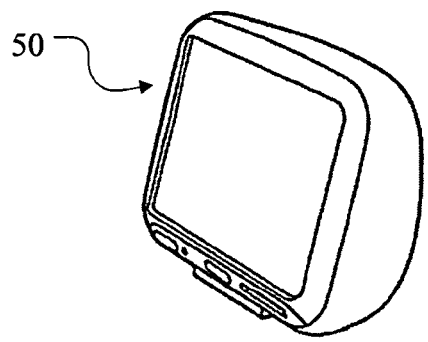
FIG. 6 is a schematic perspective view of a PND.
Figure 7:
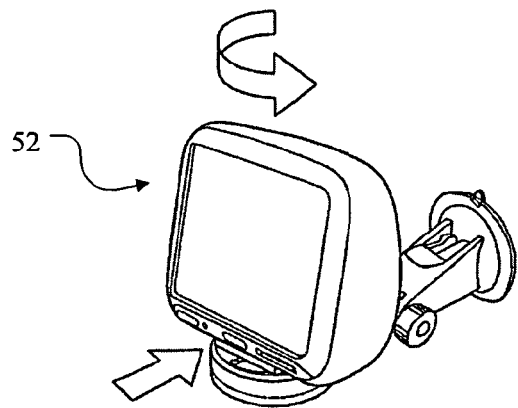
FIG. 7 is a schematic perspective view of a PND for in-vehicle use.
Figure 8:
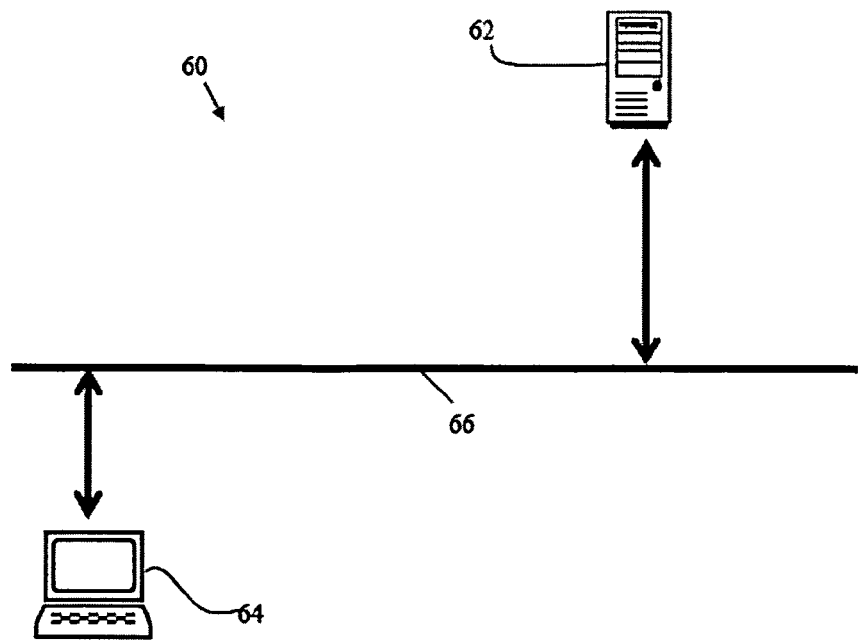
FIG. 8 is a schematic block diagram of a network based map display system.

FIGS. 6, 7 and 8 represent different types of apparatus that may implement the techniques of the preferred embodiment. FIG. 6, illustrates a handheld PND 50, and FIG. 7 illustrates a PND 52 suitable for in-vehicle use. The PNDs 50 and 52 typically store the digital map 20 by using semiconductor and/or magnetic memory media. The PNDs 50 and 52 typically include a local processor, that implements the rendering module 22 by execution of software. FIG. 8 illustrates a networked computer system 60 comprising a server 62 communicating with one or more terminals 64 via a network 66. The network 66 may include a local intranet and/or a wider internet (such as the world-wide-web). The server 62 stores the digital map 20 and supplies map image generation information upon demand to a requesting terminal 64. In one form, the server 62 may perform the image calculation, including the function of the map rendering module 22, in order to provide an already-rendered image to the terminal 64 for display. In another form, the terminal 64 may perform the image calculation, including the function of the map rendering module 22, based on unrendered information received from the server 62. Alternatively, the function of the map rendering module 22 may be divided amongst both the server 62 and the terminal 64, to include both server processing and local terminal processing.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of rendering a display image generated from digital map information, the method comprising:
   determining elevation information from the digital map information;
   determining display scale information for the display image;
   determining a shading value to apply to a pixel in the display image, the shading value being based on a first shading function and a second shading function and varying as a function of the elevation information and the display scale information; and
   applying the shading value to the respective pixel in the display image, to generate a display that represents elevation information by pixel shading that varies with display scale.

2. The method of claim 1, wherein the step of determining a shading value comprises combining the first and second shading functions according to at least one weight coefficient that determines the relative contribution of each shading function.

3. The method of claim 2, wherein the at least one weight coefficient varies in dependence on the display scale information.

4. The method of claim 2, wherein the first shading function is a function that generates a shading style suitable for a small display scale image.

5. The method of claim 2, wherein the first shading function is a function that varies in dependence on absolute elevation.

6. The method of claim 2, wherein the second shading function is a function that generates a shading style suitable for a large display scale.

7. The method of claim 2, wherein the second shading function is a function that varies in dependence of elevation slope.

8. The method of claim 2, wherein the step of determining a shading value comprises using a shading algorithm represented by:

$$p = (l(z)P_{slope}(\alpha) + (1 - l(z))P_{height}(h))\frac{W_1(\sin(\alpha))}{W_2(h)}$$

wherein:
p is the shading value to apply to a pixel;
z is a parameter depending on display scale;
l(z) is a weight coefficient that varies in the interval with the display scale;
α is the elevation slope;
h is the absolute elevation;
$P_{slope}$ is a shading function that varies with elevation slope;
$P_{height}$ is a shading function that varies with absolute elevation;
W1 and W2 are constants.

9. The method of claim 2, wherein the at least one weight coefficient varies asymptotically between the values of 0 and 1, one of said values corresponding to a relatively large display scale, and the other of said values corresponding to a relatively small display scale.

10. The method of claim 2, wherein the at least one weight coefficient varies as a continuous function of the display scale information.

11. The method of claim 2, wherein the at least one weight coefficient varies as a function represented by a sequence of first and second Bezier spline curves.

12. The method of claim 1, wherein the elevation information comprises at least one item of information selected from: absolute elevation; elevation slope; first shading information representing a first elevation shading function; second shading information representing a second elevation shading function.

13. A non-transitory computer-readable medium which stores a set of instructions which, when executed by a processor, configures the processor to perform a method of rendering a display image generated from digital map information, the method comprising:
   determining elevation information from the digital map information;
   determining display scale information for the display image;
   determining a shading value to apply to each pixel in the display image, the shading value being based on a first shading function and a second shading function and varying as a function of the elevation information and the display scale information;
   applying the shading value to the respective pixel in the display image, to generate a display that represents elevation information by pixel shading that varies with display scale; and
   rendering a map image from the digital map information using the determined shading value associated with each pixel.

14. Apparatus for rendering a display image generated from digital map information comprising:
   a memory storage for storing the digital map information;
   one or more processors coupled to the memory storage, wherein the one or more processors are operative to:
   determine elevation information from the digital map information;
   determine display scale information for the display image;
   determine a shading value to apply to a pixel in the display image, the shading value being based on a first shading function and a second shading function and varying as a function of the elevation information and the display scale information; and
   apply the shading value to the respective pixel in the display image, to generate a display that represents elevation information by pixel shading that varies with display scale.

15. The apparatus of claim 14, wherein the apparatus is configured to determine the shading value by combining the first and second shading functions according to at least one weight coefficient that determines the relative contribution of each shading function.

16. The apparatus of claim 15, wherein the at least one weight coefficient varies in dependence on the display scale information.

17. The apparatus of claim 15, wherein the first shading function is a function that generates a shading style suitable for a small display scale image.

18. The apparatus of claim 15, wherein the first shading function is a function that varies in dependence on absolute elevation.

19. The apparatus of claim 15, wherein the second shading function is a function that generates a shading style suitable for a large display scale.

20. The apparatus of claim 15, wherein the second shading function is a function that varies in dependence of elevation slope.

21. The apparatus of claim 15, wherein the step of determining a shading value comprises using a shading algorithm represented by:

$$p = (l(z)P_{slope}(\alpha) + (1-l(z))P_{height}(h))\frac{W_1(\sin(\alpha))}{W_2(h)}$$

wherein:
p is the shading value to apply to a pixel;
z is a parameter depending on display scale;
l(z) is a weight coefficient that varies in the interval with the display scale;
$\alpha$ is the elevation slope;
h is the absolute elevation;
$P_{slope}$ is a shading function that varies with elevation slope;
$P_{height}$ is a shading function that varies with absolute elevation;
W1 and W2 are constants.

22. The apparatus of claim 15, wherein the at least one weight coefficient varies asymptotically between the values of 0 and 1, one of said values corresponding to a relatively large display scale, and the other of said values corresponding to a relatively small display scale.

23. The apparatus of claim 15, wherein the at least one weight coefficient varies as a continuous function of the display scale information.

24. The apparatus of claim 15, wherein the at least one weight coefficient varies as a function represented by a sequence of first and second Bezier spline curves.

* * * * *